United States Patent [19]

Kurabayashi et al.

[11] Patent Number: 5,072,337
[45] Date of Patent: Dec. 10, 1991

[54] ELECTRICAL DOUBLE-LAYER CAPACITOR

[75] Inventors: Ken Kurabayashi, Chigasaki; Yoshinobu Tsuchiya, Fujisawa; Akio Yoshida, Kamakura; Hitoshi Koizumi, Hiratsuka, all of Japan

[73] Assignee: Isuzu Motors Limited, Tokyo, Japan

[21] Appl. No.: 559,082

[22] Filed: Jul. 30, 1990

[30] Foreign Application Priority Data

Aug. 23, 1989 [JP] Japan .................................. 1-216968

[51] Int. Cl.$^5$ .............................................. H01G 9/00
[52] U.S. Cl. .................................................. 361/502
[58] Field of Search ........................ 361/502; 29/25.03

[56] References Cited

U.S. PATENT DOCUMENTS 3,656,027 4/1972 Isley ..................................... 361/502

FOREIGN PATENT DOCUMENTS

3422863A1 1/1985 Fed. Rep. of Germany .
56-070623 6/1981 Japan .

OTHER PUBLICATIONS

Patent Abstracts of Japan, vol. 13, No. 386 (E-812) (3734), Aug. 1989 (JP-A-01 136326).
Patent Abstracts of Japan, vol. 13, No. 493 (E-842) (3841), Nov. 1989 (JP-A-01 196807).
Patent Abstracts of Japan, vol. 12, No. 186 (C-500) May 1988 (JP-A-62 292612).

Primary Examiner—Donald A. Griffin
Attorney, Agent, or Firm—Spencer & Frank

[57] ABSTRACT

The polarizing electrode of an electrical double-layer capacitor cell is constituted with solid plate-like polarizing electrodes (61, 71) and paste-like polarizing electrodes (6, 7). The solid plate-like polarizing electrodes (61, 71) are counterposedly arranged by being separated with a separator (5). The paste-like polarizing electrodes (6, 7) are coated on the surfaces at the outside of the solid plate-like polarizing electrodes (61, 71). Since the paste-like polarizing electrodes (6, 7) contact also to the solid plate-like polarizing electrodes (61, 71) and the collecting electrodes (1, 2) well, the contact resistance becomes small.

4 Claims, 1 Drawing Sheet

ELECTRICAL DOUBLE-LAYER CAPACITOR

TECHNICAL FIELD

The present invention relates to an electrical double-layer capacitor wherein the structure of the polarising electrode has been improved.

BACKGROUND ART

FIG. 3 shows a conventional electrical double-layer capacitor cell. In FIG. 3, numerals 1 and 2 denote collecting electrodes, 3 and 4 gaskets, 5 a separator, and 6 and 7 paste-like polarizing electrodes.

The collecting electrodes 1 and 2 are formed of conductive rubber sheets, and the gaskets 3 and 4 are formed of insulating rubber. The paste-like polarizing electrodes 6 and 7 are made of paste-like active carbon powder formed by immersing dilute sulfuric acid in the powder. For the separator 5, a porous plastic film which passes ions, but which does not pass the active carbon particles, is used.

In order to make good contact between the active carbon particles to and to make good contact between the collecting electrode 1 and the paste-like polarizing electrode 6 and between the collecting electrode 2 and the paste-like polarizing electrode 7 pressure is applied on the collecting electrodes 1 and 2. In order not to be destroyed by this pressure, the materials for the collecting electrodes 1 and 2 and for the gaskets 3 and 4 should be such which have elasticity.

In order to make the capacity of such an electrical double-layer capacitor cell large, it is necessary to increase the specific surface area (usually, 1000 to 2000 m$^2$/g) of the active carbon forming the polarizing electrode, and to make the bulk density in the capacitor case when it has been filled large.

On the other hand, since the polarizing electrode is difficult to handle in such a state when it is in a paste-like form, there has been proposed a method in which the polarizing electrode is sintered to become a solid plate-like form (for example, the official publication of the Japanese Patent Application Laid-Open No. 292612/1987). When it is formed in a solid plate-like state, there is also the advantage that the bulk density is enhanced and the capacity is increased, and additionally, the contact of the active carbon particles to each other becomes denser to decrease the contact resistance.

Problem

However, in the above-described conventional electrical double-layer capacitor cell in which a solid plate-like polarizing electrode has been used, there was a problem that the contact resistance between the solid plate-like polarizing electrode and the collecting electrode is liable to become large.

Explanation of the Problem

When the polarizing electrode is made as a solid plate-like polarizing electrode, although the contact of active carbon particles to each other becomes good and the contact resistance between the particles to each other diminishes, the contact of the solid plate-like polarizing electrode and the collecting electrode is not uniform, and the contact resistance between both of these electrodes is liable to become large. Then, the internal resistance, in the case when it is considered as a whole, of the electrical double-layer capacitor cell is unable to be prevented from becoming large.

For making good contact between the solid plate-like polarizing electrode and the collecting electrode, there can be considered a method in which pressure is applied to the collecting electrode from outside and the solid plate-like polarizing electrode is let forcedly to be contacted.

However, then, there is a great danger that the solid plate-like polarising electrode is destructed by the force. Therefore, this method is unable to be abopted.

The present invention has the object of solving such a problem as described above.

SUMMARY OF THE INVENTION

The first object of the present invention is to make the contact resistance between the solid plate-like polarizing electrode and the collecting electrode in an electrical double-layer capacitor cell small.

The second object of the present invention is to make pressure applied from outside of the collecting electrode unnecessary, in an electrical double-layer capacitor cell.

The third object of the present invention is to make material having high rigidity and thin thickness (for example, plastic material) usable as the material for the collecting electrode and the gasket, and thereby, to make the electrical double-layer capacitor cell be miniaturized.

In order to attain those objects, in the present invention, there is provided an electrical double-layer capacitor cell in equipped with solid plate-like polarising electrodes separated by a separator, and additional paste-like polarizing electrodes intervened between each solid plate-like polarizing electrode and the associated collecting electrode.

These and other objects of the invention will become more apparent in the detailed description and examples which follow.

DETAILED DESCRIPTION OF THE PREFERRED EMBODIMENTS

In the following, the embodiment of the present invention will be explained in detail based on FIGS. 1 and 2 of the drawings.

Figure 1:
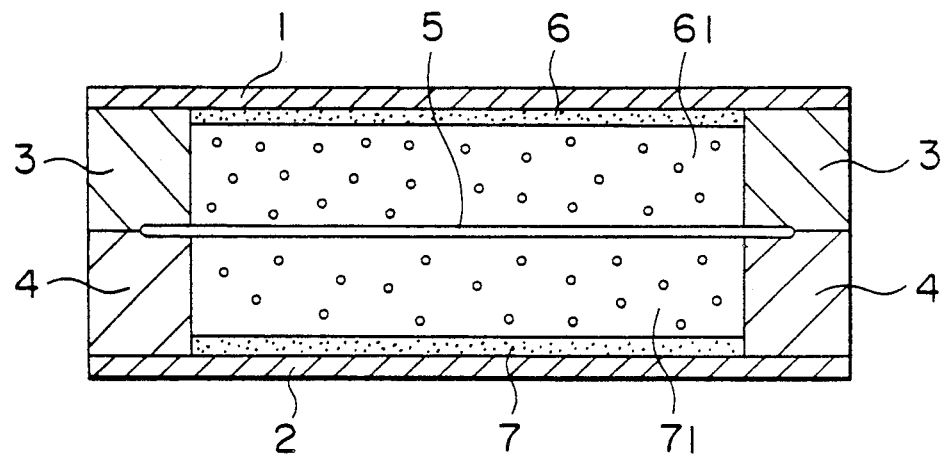
FIG. 1 is a diagram showing the electrical double-layer capacitor cell according to one embodiment of the present invention.
Figure 2:
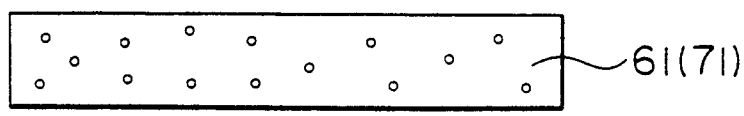
FIG. 2 is a diagram for showing the solid plate-like polarising electrode.
Figure 3:
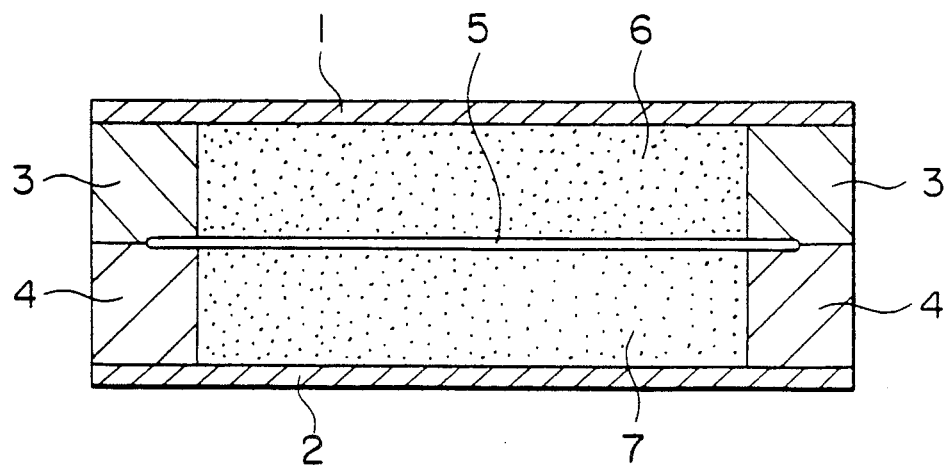
FIG. 3 is a diagram for showing the conventional electrical double-layer capacitor cell.

FIG. 1 shows the electrical double-layer capacitor cell according to the embodiment of the present invention, and FIG. 2, shows a solid plate-like polarizing electrode for the embodiment of FIG. 1. In these figures, reference numerals corresponding to those of FIG. 3 are used for like parts. Numerals 61 and 71 denote solid plate-like polarizing electrodes made by sintering particle-like active carbon and having an electrolytic liquid such as dilute sulfuric acid and the like impregnated thereinto.

In the present invention, the polarizing electrode is made in a two layer structure. In order to utilize the advantages that the handling is easy, and that the contact resistance between active carbon particles to each other is small, although almost all of the polarizing electrodes are made in solid plate-like form. there paste-like polarizing electrodes also are provided.

Solid plate-like polarizing electrodes 61 and 71 are arranged by being separated with a separator 5, and occupy almost all part of the respective polarizing electrodes. The paste-like polarizing electrode 6 is thinly coated on the side of the solid plate-like polarizing electrode 61 facing the collecting electrodes by use of the doctor knife method and the like.

Since the paste-like polarizing electrode 6 is in a paste-like form, it contacts both the collecting electrode 1 and the solid plate-like polarizing electrode 61 well, and makes the contact resistance small.

Similarly, the paste-like polarizing electrode 7 is also coated on the solid plate-like electrode 71, and makes the contact resistance between electrode 71 and the collecting electrode 2 small.

Therefore, it is no longer necessary to apply pressure from the outside of the collecting electrode, 1 or 2 in order to make contact resistance between the collecting electrode and the polarizing electrode small. Therefore, a material having high rigidity and thin thickness (for example, plastics), which previously had the fear of being broken by the application of pressure, has become capable of being used for the collecting electrodes 1 or 2 and gaskets 3 and 4. Since the thickness of the collecting electrode 1 or 2 and the gasket 3 or 4 can be made thin, the size of the entire electrical double-layer capacitor cell also can be made small.

Although the invention has been described in its preferred form with a certain degree of particularity, it is understood that the eresent disclosure of the preferred form has been changed in the details of construction and the combination and arranged of parts may be resorted to without departing from the spirit and the scope of the invention as hereinafter claimed.

We claim:

1. An electrical double-layer capacitor characterized by being provided with solid plate-like polarizing electrodes separated by a separator, and a respective further paste-like polarizing electrode intervened between each said solid plate-like polarizing electrode and the associated collecting electrode.

2. An electrical double-layered capacitor as defined in claim 1, wherein each said solid plate-like polarizing electrode is formed of sintered active carbon particles impregnated with an electrolytic liquid.

3. In an electrical double layer capacitor cell including first and second polarizing electrodes disposed opposite one another between respective first and second collecting electrodes and opposite sides of a separator; the improvement wherein each of said first and second polarizing electrodes comprises a solid plate-like polarizing electrode portion disposed adjacent one of said opposite sides of said separator, and a paste-like polarizing electrode layer portion disposed between and contacting both the said solid plate-like portion and the associated one of said first and second collecting electrodes.

4. An electrical double layer capacitor cell as defined in claim 3, wherein each of said paste-like polarizing electrode layer portions is a coating on a surface of one of said plate-like polarizing electrode portions and is thin relative to the thickness of the associated said solid plate-like polarizing electrode portion.

* * * * *